(12) United States Patent  
Abbott

(10) Patent No.: US 7,388,657 B2  
(45) Date of Patent: Jun. 17, 2008

(54) SYSTEM AND METHOD FOR MONITORING AN OPTICAL COMMUNICATION SYSTEM

(75) Inventor: Stuart M. Abbott, Marlboro, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 11/209,181

(22) Filed: Aug. 22, 2005

(65) Prior Publication Data

US 2007/0041006 A1 Feb. 22, 2007

(51) Int. Cl.
*G01N 21/00* (2006.01)
(52) U.S. Cl. .................................... 356/73.1
(58) Field of Classification Search ............... None
See application file for complete search history.

(56) References Cited

U.S. PATENT DOCUMENTS

| | | | |
|---|---|---|---|
| 5,926,263 | A | 7/1999 | Lynch et al. |
| 5,969,833 | A | 10/1999 | Jensen |
| 6,028,684 | A | 2/2000 | Kidorf |
| 6,301,036 | B1 | 10/2001 | Spencer |
| 6,414,775 | B1 | 7/2002 | Pedersen |
| 6,708,004 | B1 | 3/2004 | Homsey |
| 6,842,586 | B2 | 1/2005 | Neubelt et al. |
| 7,009,693 | B2 * | 3/2006 | Takashina et al. .......... 356/73.1 |
| 7,035,545 | B2 * | 4/2006 | Meli et al. .................. 398/84 |
| 2004/0047295 | A1 | 3/2004 | Morreale | 
| 2004/0047629 | A1 | 3/2004 | Evangelides, Jr. et al. |
| 2004/0096214 | A1 | 5/2004 | Morreale et al. |

FOREIGN PATENT DOCUMENTS

EP 1372272 12/2003
WO 2004056017 7/2004

OTHER PUBLICATIONS

European Search Report dated Dec. 5, 2006 received in corresponding European Patent Application Serial No. 06119183.9 (6 pages).
Cornwell, et al., "In-service Line Performance Monitoring with COTDR" Red Sky Systems, Poster We 15.2 article, undated. (3 pages), no date.
European Office Action mailed on Sep. 13, 2007 in connection with corresponding European Patent Application No. 06119183.9.

* cited by examiner

*Primary Examiner*—Tu T Nguyen
(74) *Attorney, Agent, or Firm*—Grossman, Tucker, Perreault & Pfleger, PLLC

(57) ABSTRACT

A monitoring system and method may be used to monitor an optical communication system. A monitoring system and method may be used to derive loop gain data sets from optical time domain reflectometry (OTDR) or coherent optical time domain reflectometry (COTDR) data. A monitoring system and method may also use differential monitoring techniques to obtain data representing gain tilt in the transmission system and to locate an anomalous loss or gain in the transmission system.

25 Claims, 11 Drawing Sheets

SYSTEM AND METHOD FOR MONITORING AN OPTICAL COMMUNICATION SYSTEM

TECHNICAL FIELD

The present invention relates to monitoring optical communications systems and more particularly, to a system and method for monitoring an optical path in an optical communications system by monitoring features of the gain-versus-wavelength characteristics in the optical path.

BACKGROUND INFORMATION

Bi-directional optical communications systems may be built from pairs of optical paths connecting terminating points (e.g., terminals) of the system. Each optical path may transmit information encoded on an optical carrier from one terminal to the other terminal. In a long haul optical communication system, each optical path may be built from a sequence of concatenated spans. Each of the spans may include a medium for transmitting the optical signal (e.g., one or more optical fibers) and an amplifier (e.g., an optical amplifier) to compensate in whole or in part for optical loss resulting from propagation through the optical medium. An optical communication system may include path pairs having a set of optical wavelengths common to both optical paths such that both paths support optical transmission between terminals at any wavelength within the set of optical wavelengths. One example of such an optical communication system may use Wavelength Division Multiplexing (WDM) for simultaneous transmission of multiple optical signals at different optical wavelengths through a common optical path.

The owner/operator of an optical communications system generally wants to monitor the health of the system and particularly the optical paths in the system. Monitoring techniques may be used, for example, to detect faults or breaks in the fiber optic cable, faulty repeaters or amplifiers or other problems within the system. Active monitoring techniques have been developed based on measurement processes (e.g., incorporated in repeaters housing the optical amplifiers), which may be controlled and queried through communication channels between a system terminal and a repeater implementing common/response functions.

Passive monitoring techniques have also been developed, which launch an optical monitoring signal into an outbound optical path from a monitoring terminal with a portion of that monitoring signal coupled to an incoming path at one or more points in the path pair. The monitoring signal may be modulated onto an optical carrier, such as a dedicated optical carrier (or tone) or a system data channel, at a specific wavelength within the transmission bandwidth of the optical paths of the optical communication system. The coupling between outbound and inbound paths may be implemented with passive optical components (e.g., optical couplers, optical attenuators, and/or optical filters), for example, located in one or more repeaters in the system. The portion of the monitoring signal coupled to the incoming path may be returned to the monitoring terminal and detected and measured at the monitoring terminal. The monitoring signal returned to the monitoring terminal may be a sample of the outbound monitoring signal, a sample of that part of the outbound monitoring signal reflected by elements in the outbound path, or both. Passive monitoring techniques include optical time domain reflectometry (OTDR), coherent optical time domain reflectometry (COTDR), and high loss loop back (HLLB).

According to existing OTDR techniques, an OTDR signal source generates a test or probe signal, such as an optical pulse or a specially modulated optical carrier, and the test signal is launched into the outbound optical path of a path pair. Elements in the outbound path may reflect (e.g., backscatter) portions of the OTDR test signal. The backscattered signal portions may be returned (e.g., on the same outbound path or a different path such as the inbound path) and detected in an OTDR receiver. The transmission characteristics of each element in the path may also affect the amount of signal reflected at points after that element, for example, by attenuating the test signal or the reflected signal. The magnitude of the backscattered or reflected signal from each element or point along the optical path may be used as a metric for characterizing the optical path.

Coherent optical time domain reflectometry (COTDR) is an enhancement of OTDR and may be used in long-haul WDM systems such as undersea optical communication systems. COTDR uses a special optical modulation scheme for its test signal and a coherent optical detection receiver to improve receiver sensitivity. The improved sensitivity enables measurement of very low levels of backscattered signal and thus the examination of very long optical fibers even if the fibers are in portions of the optical path far from the COTDR equipment (e.g., beyond an optical amplifier). Because Rayleigh backscatter from optical fiber in the transmission path can be detected by OTDR or COTDR, this approach to system monitoring provides a diagnostic tool that allows the user to examine the fiber between repeaters.

According to a high loss loop back (HLLB) monitoring method, a path pair may be equipped with a passive coupling component by which a sample of a forward propagating monitoring signal is coupled into a return path. A terminal may include line monitoring equipment (LME) for generating the monitoring signal and launching the monitoring signal into the outbound path and for monitoring the magnitude of the sample of the monitoring signal returned from each coupling point in the path pair. HLLB monitoring may use loop gains or changes of loop gains to characterize the optical path or to detect changes in the optical paths. Loop gain is the ratio of the magnitude of the detected sample from a given coupling point to the magnitude of the monitoring signal launched into the outbound path of the optical communication system. Unlike OTDR/COTDR monitoring methods, HLLB monitoring generally does not allow monitoring of elements in the optical path between coupling points, except inasmuch as those elements affect the loop gain measured for each coupling point.

These existing monitoring techniques may have other advantages and disadvantages. In OTDR/COTDR methods, for example, the coupling devices used between the optical paths may be less expensive than the coupling devices used between optical paths for HLLB methods. On the other hand, HLLB monitoring allows data sets to be obtained more quickly and may be used in conjunction with automatic signature analysis techniques to facilitate discovery and diagnosis of faults in the optical paths.

BRIEF DESCRIPTION OF THE DRAWINGS

These and other features and advantages of the present invention will be better understood by reading the following detailed description, taken together with the drawings wherein.

DETAILED DESCRIPTION

A monitoring system and method, consistent with the present invention, may be used to monitor one or more optical paths in an optical communication system. Consistent with one embodiment, the monitoring system and method may be used to derive loop gain data sets from optical 'time domain reflectometry (OTDR) or coherent optical time domain reflectometry (COTDR) data. Consistent with another embodiment, the monitoring system and method may also use differential monitoring techniques to obtain data representing gain tilt in the optical communication system, which may be used to locate an anomalous loss or gain in the optical communication system. Differential monitoring techniques may be used with OTDR, COTDR and/or high loss loop back (HLLB) monitoring, as described in greater detail below. The monitoring system and method may be used during system assembly or after a system has been installed to provide either in-service or out-of-service testing.

Figure 1:
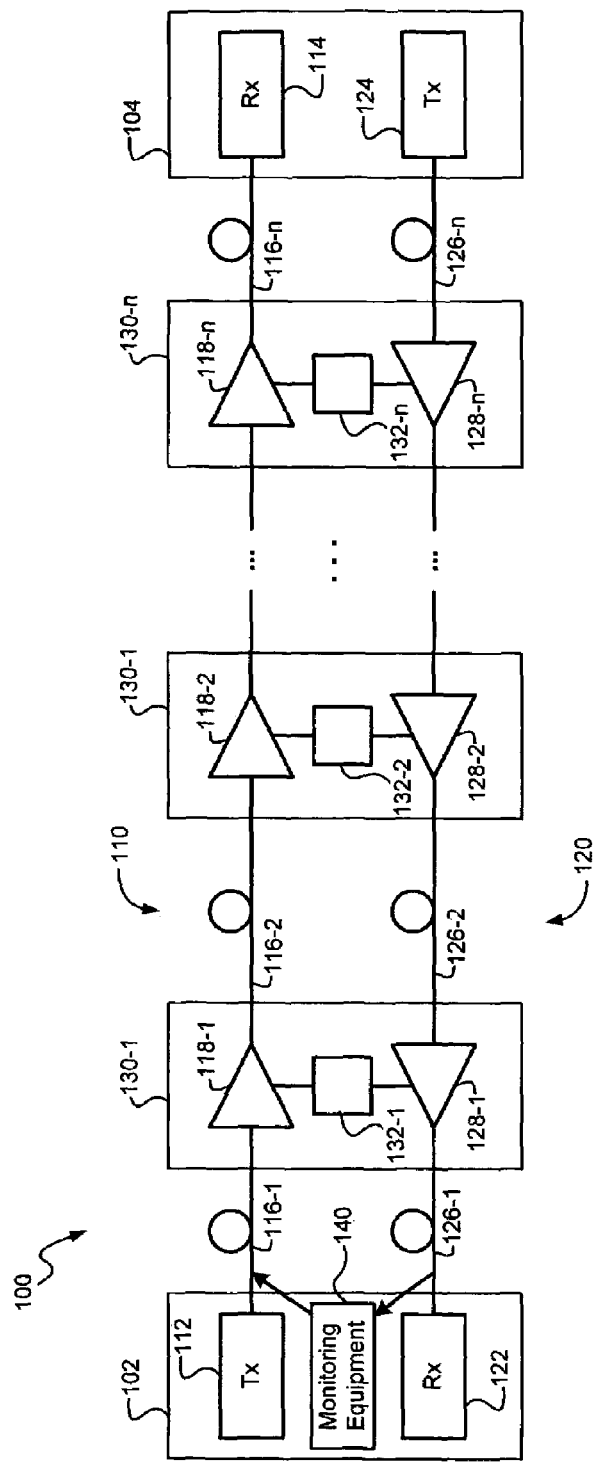
FIG. 1 is a diagrammatic view of an optical communication system, consistent with one embodiment of the present invention.

Referring to FIG. 1, a monitoring system and method may be implemented in a bi-directional optical communication system 100. The optical communication system 100 may include terminals 102, 104 connected by two unidirectional optical paths 110, 120, which together form a bi-directional optical path pair. Optical path 110 may transmit information in one direction from a transmitter 112 in the terminal 102 to a receiver 114 in the terminal 104. Optical path 120 may transmit information in the other direction from a transmitter 124 in the terminal 104 to a receiver 122 in the terminal 102. With respect to terminal 102, the optical path 110 is an outbound path and the optical path 120 is an inbound path. The optical path 110 may include an alternating concatenation of optical fibers 116-1 to 116-$n$ and optical amplifiers 118-1 to 118-$n$, and the optical path 120 may include an alternating concatenation of optical fibers 126-1 to 126-$n$ and optical amplifiers 128-1 to 128-$n$.

The optical path pair (e.g., optical paths 110, 120) may be configured as a set of amplifier pairs 118-1 to 118-$n$ and 128-1 to 128-$n$ within repeaters 130-1 to 130-$n$ connected by pairs of optical fibers 116-1 to 116-$n$ and 126-1 to 126-$n$, which may be included in an optical fiber cable together with fibers supporting additional path pairs. Each repeater 130 may include a pair of amplifiers 118, 128 for each path pair and may include additional amplifiers for additional path pairs. Optical amplifiers 118, 128 may include erbium doped fiber amplifiers (EDFAs) or other rare earth doped fiber amplifiers, Raman amplifiers or semiconductor optical amplifiers. A coupling path 132-1 to 132-$n$ may be coupled between optical paths 110, 120, for example, in one or more of the repeaters 130-1 to 132-$n$ and may include, for example, one or more passive optical coupling components, as will be described in greater detail below.

Monitoring equipment 140 may be located in one or both of the terminals 102, 104 to provide passive line monitoring for the path pair (e.g., using OTDR, COTDR or HLLB). Monitoring equipment 140 may perform the signal generation, signal detection and processing functions and may include transmitters, receivers, and processors configured to perform those functions. Monitoring equipment 140 may launch a monitoring or test signal into one optical path 110 (e.g., an outbound optical path). Coupling paths 132-1 to 132-$n$ may couple a sample of the monitoring or test signal propagating in optical path 110 into the forward propagating direction of the other optical path 120 (e.g., an inbound optical path). Monitoring equipment 140 may then receive and measure the samples.

Although the coupling paths 132-1 to 132-$n$ are shown as located with each pair of amplifiers 118-1 to 118-$n$ and 128-1 to 128-$n$, the coupling paths may be located in other locations (e.g., outside of amplifier pairs) and may not be located in every amplifier pair. According to an exemplary embodiment, the coupling paths 132-1 to 132-$n$ may be symmetric in operation, i.e., the function that describes the percent of optical power at each wavelength transferred from path 110 to path 120 by a coupling path 132-1 is the same as the function that describes the percent of optical power at each wavelength transferred from path 120 to path 110 by the coupling path 132-1. Alternatively, one or more coupling paths may not be symmetric and different coupling paths may have different transfer functions. Coupling paths 132-1 to 132-$n$ may also be different for OTDR/COTDR monitoring and HLLB monitoring. A coupling path for OTDR/COTDR generally couples only reflected light (e.g., reflected OTDR test signals) on the outbound path 110 into the inbound path 120, whereas a coupling path for HLLB couples monitoring signals transmitted on the outbound path 110 into the inbound path 120.

Although an exemplary embodiment of the optical communication system 100 is shown and described, variations of the optical communication system 100 are within the scope of the present invention. The optical communication system 100 may include, for example, more optical path pairs and more or fewer repeaters. Alternatively, the optical communication system 100 may not include any optical amplifiers or may include, instead of optical amplifiers, optical pump power sources suitable for implementing optical gain by Raman amplification within optical fibers connecting repeaters.

According to an exemplary method of monitoring optical communication system 100, one or more OTDR test or probe signals may be transmitted (e.g., by monitoring equipment 140) on the outbound optical path 110. As used herein, OTDR may generally refer to both standard OTDR and coherent OTDR (COTDR). As will be. described in greater detail below, multiple OTDR test signals may be transmitted (e.g., at different wavelengths) while loading the outbound optical path 110 and/or the inbound optical path 120 to provide differential monitoring. OTDR test signals transmitted on outbound path 110 may be reflected by one or more reflecting elements in outbound optical path 110 and the reflected OTDR test signals may be coupled onto inbound optical path 120 by one or more of the coupling paths 132-1 to 132-*n*.

Figure 2:
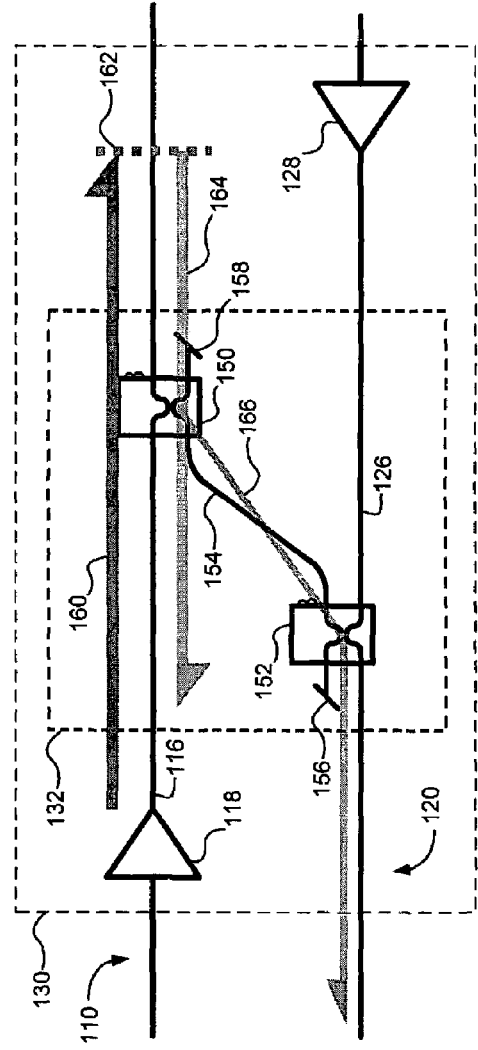
FIG. 2 is a diagrammatic view of one embodiment of a coupling path between optical paths in an optical communications system.

FIG. 2 illustrates the paths taken by test signals through a coupling path 132 used for OTDR or COTDR monitoring consistent with one embodiment. In this embodiment, the coupling path 132 may include optical couplers 150, 152 (e.g., 4-port 10-dB optical couplers) coupling an optical fiber 154 to the optical fibers 116, 126 with high-return-loss terminations 156, 158. When a forward propagating optical test signal 160 on the outbound optical path 110 encounters a scattering or reflecting point 162, a portion 164 of the forward propagating test signal 160 (i.e., a reflected test signal) may be reflected into the guided mode of the outbound optical path 110 in the reverse direction. The coupling device 132 samples the reflected portion 164 and injects a portion 166 (e.g., about 1% or −20 dB) of the reflected portion 164 into the inbound optical path 120.

Those skilled in the art will recognize that other coupling paths may be used. In a system using HLLB monitoring, for example, a coupling path may include additional components such as additional optical couplers and/or reflective optical filters (ROFs) to support HLLB monitoring.

Monitoring equipment 140 (FIG. 1) may detect the reflected OTDR test signals to obtain OTDR data (e.g., an OTDR trace) and may extract data sets, which may be analyzed to evaluate the health of optical paths. In general, the data sets may include the transit or propagation time (or delay) for a test signal to propagate from the test signal generator to the monitoring receiver (e.g., from monitoring equipment 140, through outbound path 110, coupling path 132, and return path 120 and back to monitoring equipment 140) and the strength of the detected test signal corresponding to that transit time. Using OTDR or COTDR, for example, the propagation time is approximately proportional to the distance from the monitoring equipment 140 to the system element (e.g., reflecting point 162) responsible for the detected signal. Thus, the propagation time may uniquely identify a point in the system corresponding to the detected signal, and the OTDR data sets may reveal signal strength versus system element. From an a priori understanding of the effects that path elements have on signal transmission and reflection, sets of OTDR data may be used to estimate features of the optical paths that affect the ability of the paths to transmit the data channels through the communication system. A fiber break, for example, may result in no returned signals from any elements beyond the break.

Figure 3:
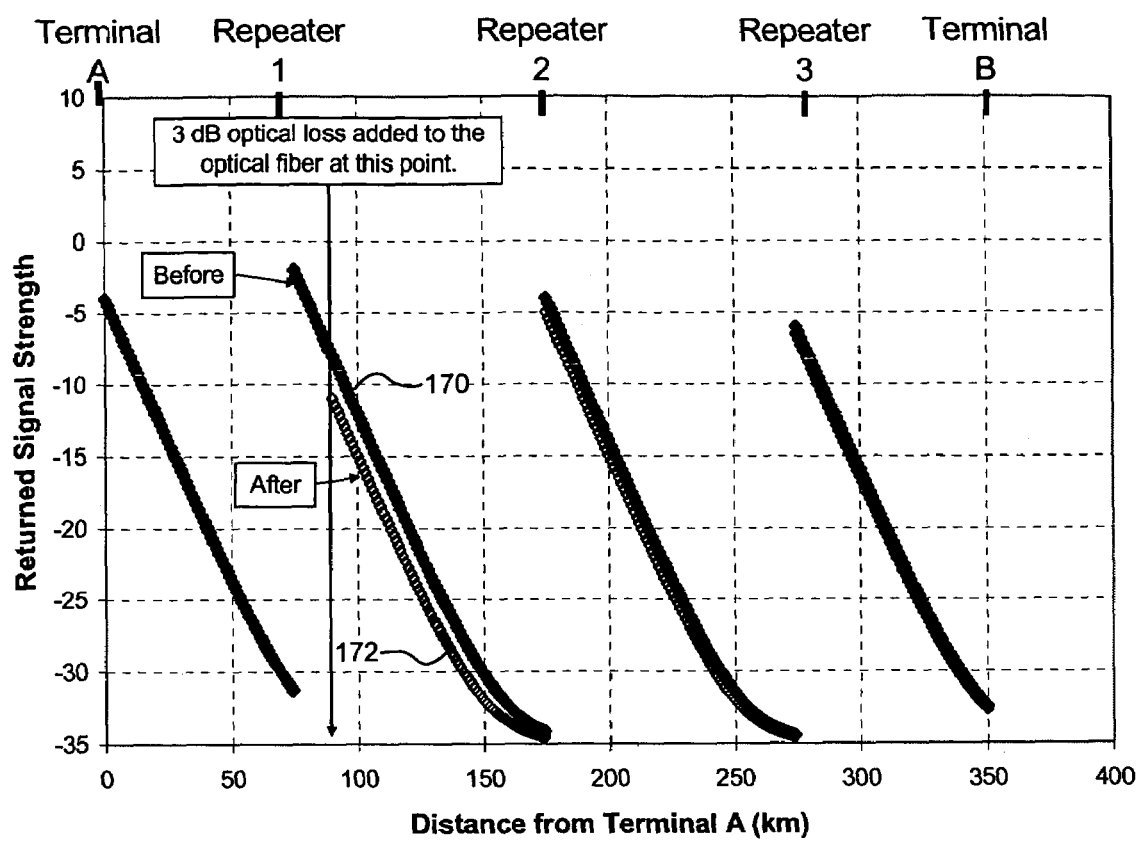
FIG. 3 is a graph illustrating an example of OTDR data showing signal strength vs. distance in an optical communication system.

FIG. 3 illustrates one example of representative data for an OTDR monitoring system. Regions of declining signal strength with increasing distance may be the result of Rayleigh scattering in optical fibers between repeaters and step increases in signal strength (e.g., at 75 km, 175 km, and 275 km) may be the result of signal amplification by an optical amplifier. Plots 170, 172, respectively, represent OTDR data for a system before and after a fault introduces 3 dB of optical attenuation to the optical fiber 15 km beyond the first repeater. The fault is indicated by a shift in the measured signal strength for all points beyond the fault. OTDR data thus includes data points corresponding to locations between repeaters as a result of detecting signals reflected by Rayleigh backscattering. In contrast, HLLB monitoring generally does not detect signals reflected by Rayleigh backscattering and HLLB data (not shown) generally includes data points representing loop gain data corresponding only to HLLB paths.

Figure 4:
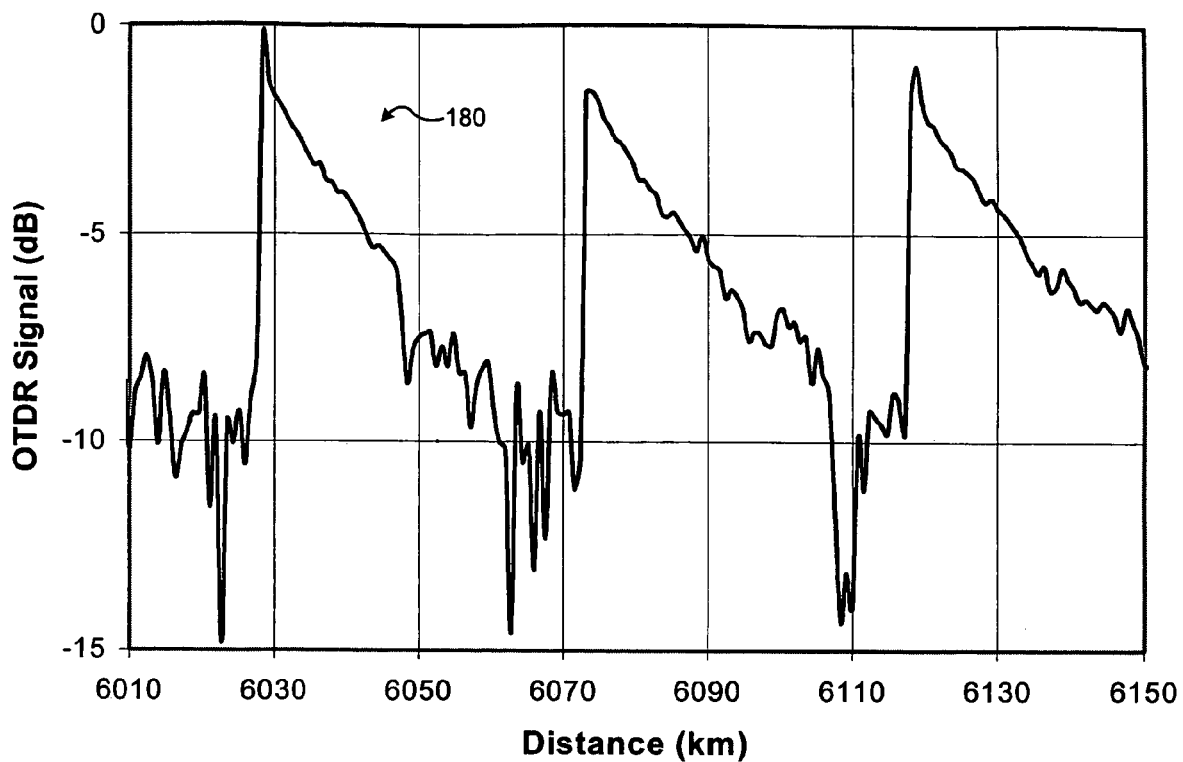
FIG. 4 is a graph illustrating an example of OTDR data obtained from an optical communication system using an OTDR test signal with reduced power to prevent impairment of data transmission on a tested optical path.

According to an exemplary method of monitoring optical communications system 100, OTDR data may be processed to extract or derive loop gain data (e.g., equivalent to loop gain data provided by HLLB monitoring). The exemplary method of processing OTDR data to extract or derive loop gain data may be implemented as software, hardware, firmware or a combination thereof, for example, in monitoring equipment 140. FIG. 4 illustrates an example of OTDR data 180 from a communication system using an OTDR test or probe signal with reduced power to prevent impairment of data transmission on the optical path being tested. As shown, the quality of the OTDR measurement may be poor for data in the latter portions of a transmission span between repeaters. A reliable estimate of loop gain data may be derived from the OTDR data 180, even though OTDR data 180 lacks quality over the latter portions of a transmission span.

Figure 5:
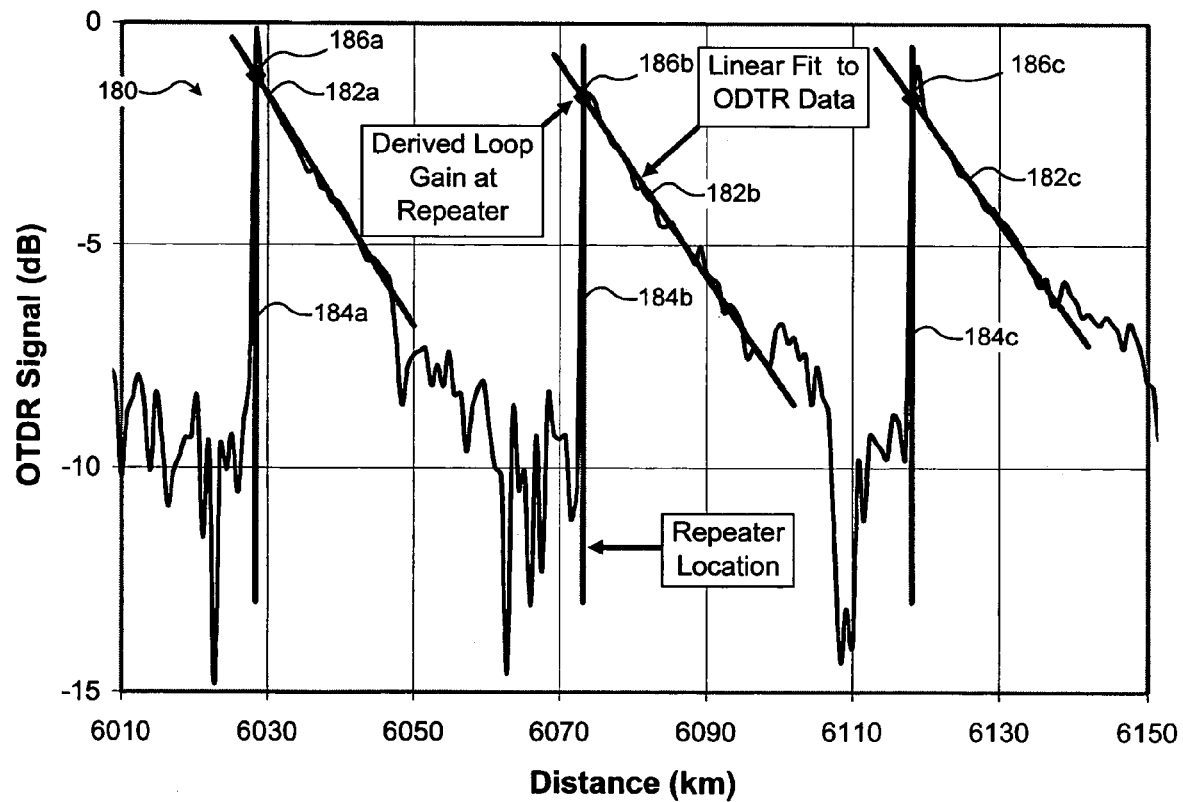
FIG. 5 is a graph illustrating an exemplary method of deriving loop gain data from the exemplary OTDR data shown in FIG. 4.

As shown in FIG. 5, one method of extracting or deriving loop gain data from OTDR data 180 includes applying a linear fit to OTDR data 180, for example, by fitting straight lines 182*a*, 182*b*, 182*c* to portions of the OTDR data 180 above the noise level evident in the latter portion of each span (e.g., between repeaters). In the OTDR data 180 corresponding to each span, for example, a fitting method such as linear regression may be used to determine the slope and vertical offset from zero for a straight line that best matches the strongest OTDR data in that span. The fitted lines 182*a*, 182*b*, 182*c* may be extrapolated back to known repeater locations (e.g., indicated by vertical lines 184*a*, 184*b*, 184*c*). Intersections 186*a*, 186*b*, 186*c* of the fitted lines 182*a*, 182*b*, 182*c* with the repeater locations (e.g., vertical lines 184*a*, 184*b*, 184*c*) yield a set of data points or numbers with the same properties as HLLB loop gain data. Although three spans (and fitted lines 182*a*, 182*b*, 182*c*) are illustrated, the method may be used with OTDR data representing any number of spans using any number of fitted lines.

An exemplary method of deriving loop gain data from OTDR data may also use a priori knowledge of the fiber loss in the optical communication system as a constraint in the fitting process. Known fiber loss may be used, for example, to set the slope of the lines 182*a*, 182*b*, 182*c* fitted to the OTDR data 180. A reasonable estimate of the vertical offset of the fitted lines 182a, 182b, 182c may then be derived with fewer OTDR data points.

Another exemplary method of deriving loop gain data from OTDR data may include applying a linear fit to the OTDR data 180, as discussed above, and then processing the resulting slopes of the fitted lines 182a, 182b, 182c into a single value representing average slope. The linear fit may then be repeated with the slope constrained by the average slope value and with vertical offset allowed to vary to optimize the fit in each span. Repeating the linear fit using average slope values may improve the quality of the loop gain estimates derived from the OTDR data.

The exemplary method may further include processing the loop gain data extracted or derived from the OTDR data sets using signature analysis processes, such as the signature analysis processes known to those skilled in the art for use with HLLB loop gain data. Signature analysis processes may be used to manually or automatically detect and/or characterize faults in an optical communication system. Signature analysis processes may be used with a network management system, for example, to locate and/or diagnose faults in optical paths and to generate system alarms. Accordingly, an exemplary monitoring system and method enables signature analysis techniques designed for use with HLLB data to be used with OTDR data obtained from an optical communication system using less expensive OTDR coupling paths.

According to another exemplary method of monitoring, differential monitoring may be used to obtain data representing changes in operating conditions of one or more optical amplifiers in an optical communication system. Differential monitoring is based on the relationship between the gain shape of an optical amplifier and the average gain of that amplifier. Gain shape is the function describing the gain of an optical amplifier for a signal at a specific wavelength as a function of the wavelength of the signal. Average gain is the ratio of the total signal output power of the amplifier divided by the total signal input power to the amplifier (e.g. in decibels). In an EDFA, for example, the pump power may be constant while the signal power varies or pump power may be controlled to control the gain or output power of the EDFA over a range of input signal powers. In either case, the gain shape of the EDFA is a function of the average gain and the spectral distribution of the input power to the EDFA. In general, lower input power may result in higher population inversion in the Erbium ions responsible for the optical gain of the EDFA, which affects gain shape.

Figure 6:
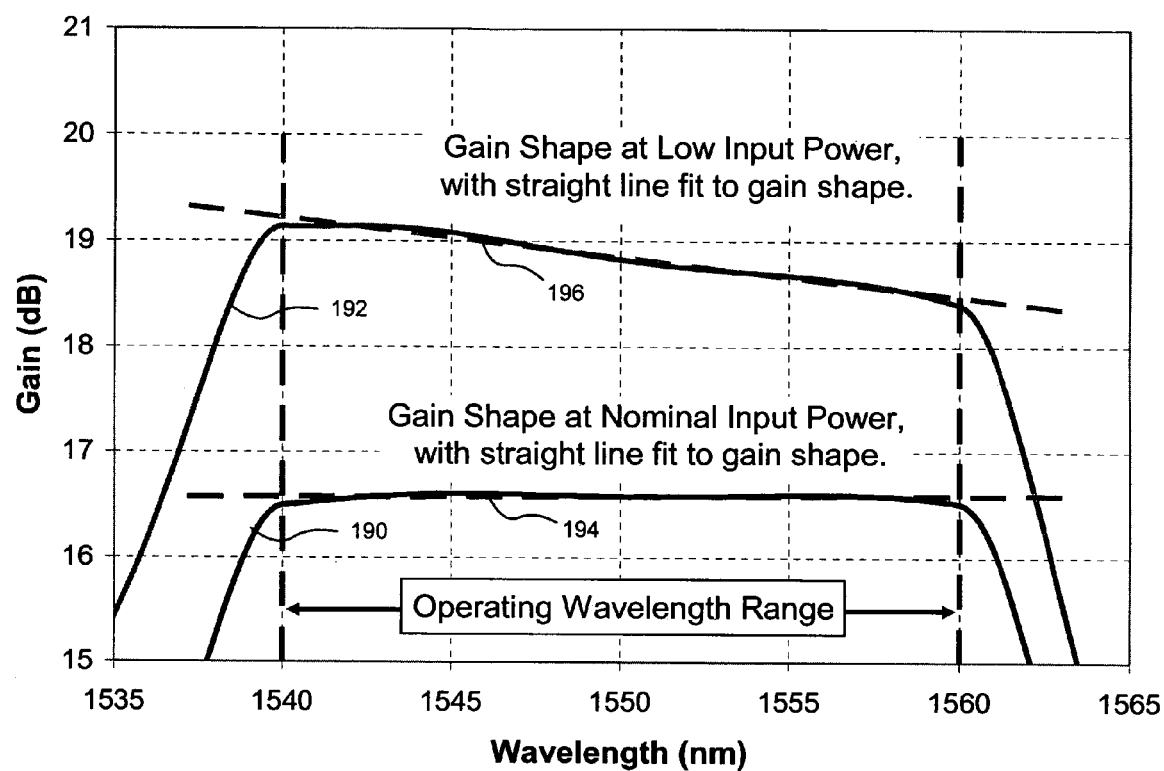
FIG. 6 is a graph illustrating gain shapes of a rare earth doped optical amplifier operating at normal input power and at low input power.

FIG. 6 illustrates the gain shape (i.e., gain v. wavelength) for an EDFA with constant pump power. Curves 190, 192 represent gain shape at two different values of total input power (e.g., nominal input power and low input power, respectively) but with the same relative distribution of signal power in the input spectrum. Changes in input power to an amplifier may occur in an optical communication system, for example, when the loss of an optical path between two amplifiers changes as a result of fiber damage, when a loss is added during repair of a cable, or when a cable is rerouted to accommodate a new construction. Lines 194, 196 fit to the gain shape curves 190, 192, respectively, in the amplifier operating wavelength range represent gain tilt of the EDFA for the given operating conditions.

Gain tilt may be used to monitor or diagnose the condition of an optical path. In an optical path for a WDM optical communication system, gain tilt is normally small for the full length of the optical path. The magnitude of the gain tilt may be a measure of how far the condition of an optical path has digressed from an optimum design and a plot of gain tilt versus distance may reveal spans at which a significant discrepancy exists between the span loss and nominal amplifier gain (i.e., the gain at which the amplifier was intended to operate in the system design). Gain tilt may also be used in conjunction with fault signature analysis processes to implement manual or automatic detection of faults in a system, for example, using a network management system. Change in gain tilt with time may also reveal progressive changes in the optical path and support processes used to estimate time to failure for the optical communication system.

In general, differential monitoring may be used to estimate gain tilt in an optical communication system by obtaining two test data measurements (e.g., OTDR data or loop gain data derived from OTDR data) and by processing the measured test data (e.g., subtracting one data set from the other data set) to obtain difference data. Test data measurements may be obtained, for example, at two different operating wavelengths or near-band wavelengths to estimate average gain and gain tilt for one or more amplifiers within an optical communication system. As used herein, operating wavelengths refer to the set of wavelengths at which a path pair of an optical communication system is transmitting signals (including both signals in active use for transmitting information and signals for system monitoring and/or control functions) through all or part of its paths. As used herein, near-band wavelengths refer to a set of wavelengths at which one or both optical paths of a path pair may transmit an optical signal through all or part of the path between terminals but does not include wavelengths at which both paths in the path pair may transmit a signal through the full distance between terminals.

Figure 7:
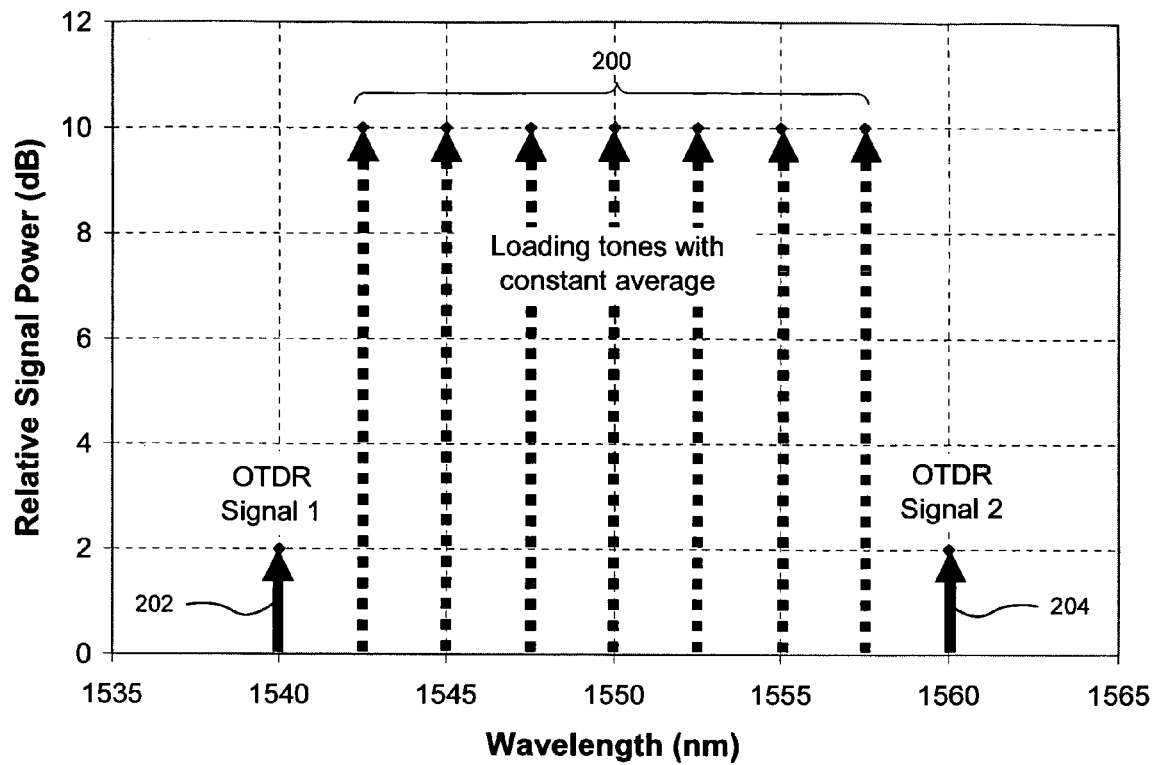
FIG. 7 is a graph illustrating one example of a loading spectrum for obtaining OTDR measurements on an optical path using differential OTDR.

In the optical communication system 100 shown in FIG. 1, for example, different sets of data may be measured or obtained (e.g., using the method as described above) while optically loading the outbound optical path 110 and/or the inbound optical path 120. As used herein, optical loading (or an optical load) refers to all optical power being transmitted through all or part of one or both optical paths in a path pair, excluding any optical signal used exclusively for monitoring and/or controlling the optical paths. An optical load may include, for example, optical power originating from optical amplifier noise (e.g., Amplified Spontaneous Emission), optical noise loading introduced at a transmitting terminal, loading tones (e.g., continuous wave or modulated optical signals), or optical power introduced into the paths as a consequence of the design of the optical amplifiers (e.g., pump power from an EDFA or Raman amplifier). Examplary systems and methods for providing optical loads are described in further detail in co-pending U.S. patent application Ser. No. 10/877,059 filed on Jun. 25, 2004 and in co-pending U.S. patent application Ser. No. 11/202,433 filed on Aug. 11, 2005 and claiming the benefit of U.S. Provisional Application Ser. No. 60/600,533, all of which are fully incorporated herein by reference Referring to FIG. 7, one method of differential monitoring includes loading a center portion of an operating wavelength range with a set of signals 200 with fixed average power while transmitting OTDR test signals 202, 204 at different test wavelengths, which may be at or near the long and short wavelength edges (e.g., 1540 nm and 1560 nm) of the operating wavelength range of the optical communication system. Any number of signals 200 (or loading tones) may be used provided that the loading wavelengths are far enough away from the test wavelengths of the test signals to avoid interference with the test signals. In one example, the loading wavelengths may be about 2.5 nm away from the test wavelengths. Although the loading tones or signals 200 are continuous wave or modulated signals with constant average power in the exemplary illustrated embodiment, broadband optical noise may also be used. Those skilled in the art will recognize that other test wavelengths may be used depending upon the operating wavelength range of the optical communication system. Alternatively, the first and second test wavelengths may not be outside of the range of loading wavelengths. For example, loading tones may be above and below the test signals.

According to an alternative method of differential monitoring, OTDR measurements may be obtained in sequence at the different test wavelengths with essentially the same input power spectrum. For example, first OTDR test signal 202 may be transmitted with loading tones or signals 200 and then second OTDR test signal 204 may be transmitted with loading tones or signals 200.

Figure 8A:
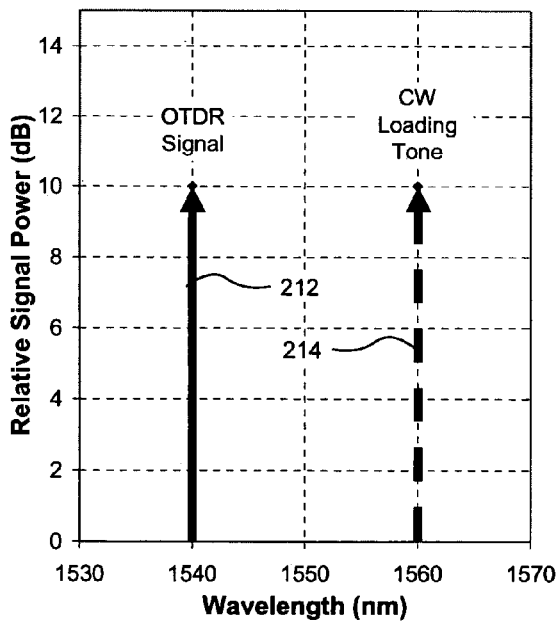
FIGS. 8A and 8B are graphs illustrating another example of input spectra for sequential OTDR measurements on an optical path using differential OTDR.
Figure 8B:
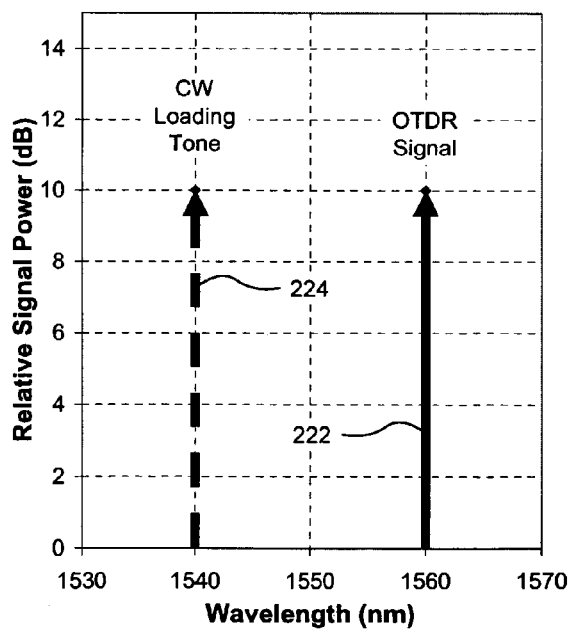

According to another alternative method of differential monitoring, shown in FIGS. 8A and 8B, a simple input spectrum pair may be used to provide similar loading for two OTDR measurements with a minimum of loading tones. A first OTDR test signal 212 may be transmitted at a first test wavelength (e.g., the short wavelength) together with a single loading tone 214 having essentially the same average optical power as the OTDR test signal 212 and at a first loading wavelength (e.g., the long wavelength). A second OTDR test signal 222 may be transmitted at a second test wavelength (e.g., the long wavelength) together with a single loading tone 224 having essentially the same average optical power as the OTDR test signal 222 and at a second wavelength (e.g., the short wavelength). Thus, the OTDR test signals 212, 222 and loading tones 214, 224 have essentially the same power but the wavelengths are reversed. Those skilled in the art will recognize that other pairs of spectra may be used to realize essentially the same optical load on the optical path while performing OTDR measurements at two different wavelengths.

As discussed above, the reflected OTDR test signals may be detected to obtain OTDR data at each of the test wavelengths. Loop gain data (e.g., representing loop gain to each amplifier in the optical path) may be extracted or derived from the OTDR data at each of the wavelengths. Gain tilt may then be estimated by obtaining the difference between either the OTDR data (e.g., before applying the linear fit) or the loop gain data derived for each amplifier.

Gain tilt may thus be advantageously used as a metric for monitoring an optical amplifier or a span in an optical path because it is derived from two independent measurements having factors in common. By obtaining the difference between the results of the measurements at the two wavelengths, measurement uncertainties arising from path features common to both measurements (e.g., Rayleigh scattering and optical loss characteristics of the fiber) may be cancelled out of the result.

Figure 9A:
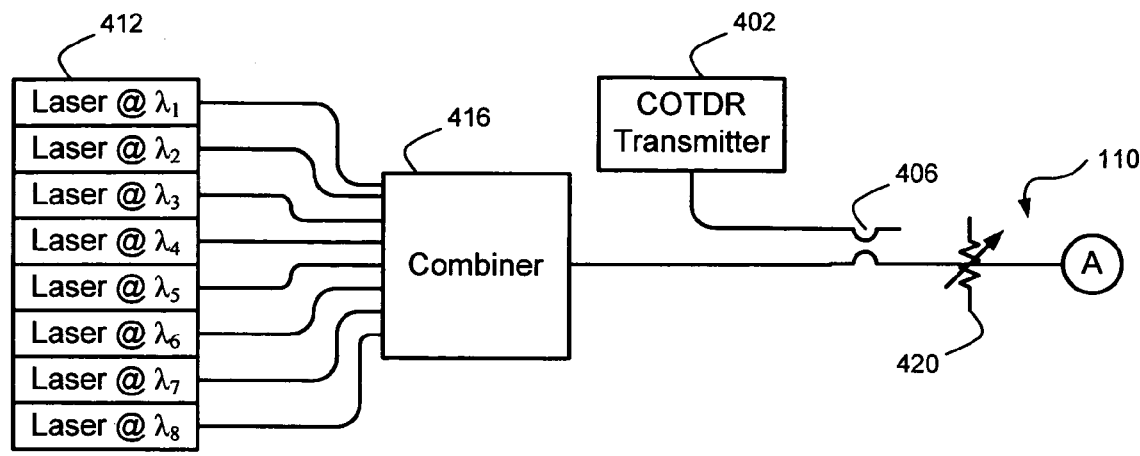
FIGS. 9A and 9B are schematic diagrams of one embodiment of a system for monitoring an optical communication system using multi-tone loading and differential COTDR.
Figure 9B:
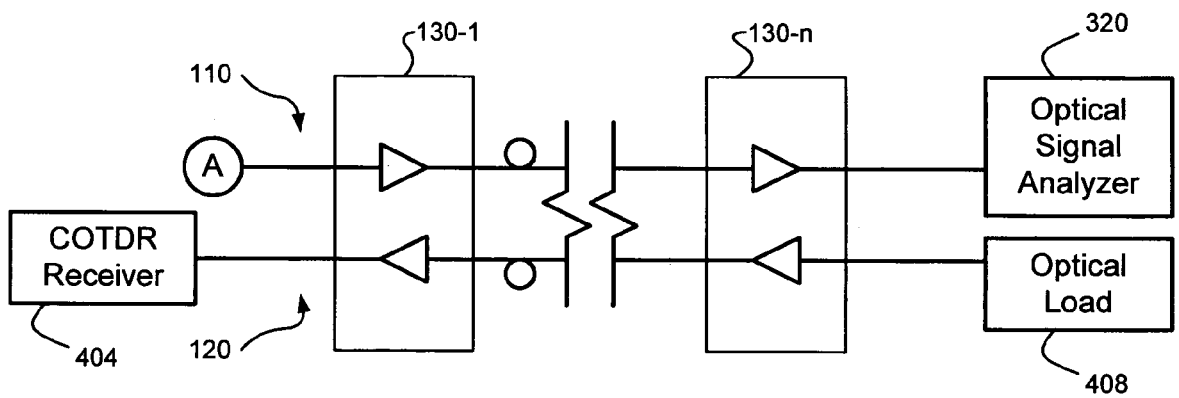

One implementation of a monitoring system and method using multi-tone loading and differential COTDR is shown in FIGS. 9A and 9B. According to this embodiment, the monitoring equipment includes a COTDR transmitter 402 to transmit COTDR test signals on the outbound optical path 110 and a COTDR receiver 404 to receive and detect the reflected COTDR test signals on the inbound or return optical path 120. The COTDR signal level may be set at the COTDR transmitter 402 to give an acceptable signal-to-noise ratio (SNR) for the COTDR measurements, which may be determined by those skilled in the art. The COTDR transmitter 402 may be coupled to the outbound optical path 110, for example, using a 10:1 coupler 406. The COTDR transmitter 402 and receiver 404 may include COTDR equipment known to those skilled in the art.

In this illustrated embodiment, multiple lasers 412 at the loading wavelengths ($\lambda_1, \lambda_2, \ldots \lambda_8$) may be used to provide the optical loads on the outbound optical path 110 and a combiner 416 may be used to combine the wavelengths onto the optical path 110. Similar loading equipment (e.g., multiple lasers and a combiner) may be used to provide an optical load 408 at the other end of the system on the inbound path 120. According to this embodiment, there may be constant optical loading across the amplifier bandwidth for the duration of the test measurements. When this differential monitoring method is implemented using COTDR, optical loading in the inbound or return optical path 120 may be dominated by the loading tones because the loading tones are stronger than the reflected COTDR test signals on the inbound optical path 120.

Although the illustrated embodiment shows eight (8) lasers to produce loading tones with eight (8) different wavelengths, those skilled in the art will recognize that a different number of lasers may be used to produce a different number of loading tones, as mentioned above. The lasers 412 may be combined to yield approximately equal powers at the several wavelengths with a total input power that results in a total input power to the first repeater near nominal (e.g., normal input power for that EDFA design). An optical signal analyzer 320 may be used (e.g., at either end of the system) to measure the gain at each of the loading wavelengths. The outbound optical path 110 and/or the inbound optical path 120 may be connected to the optical signal analyzer 320 to allow the optical signal analyzer to monitor the input power at the several wavelengths. An attenuator 420 may be used to control the optical power of the loading tones to provide the desired input power to the first repeater.

Figure 10:
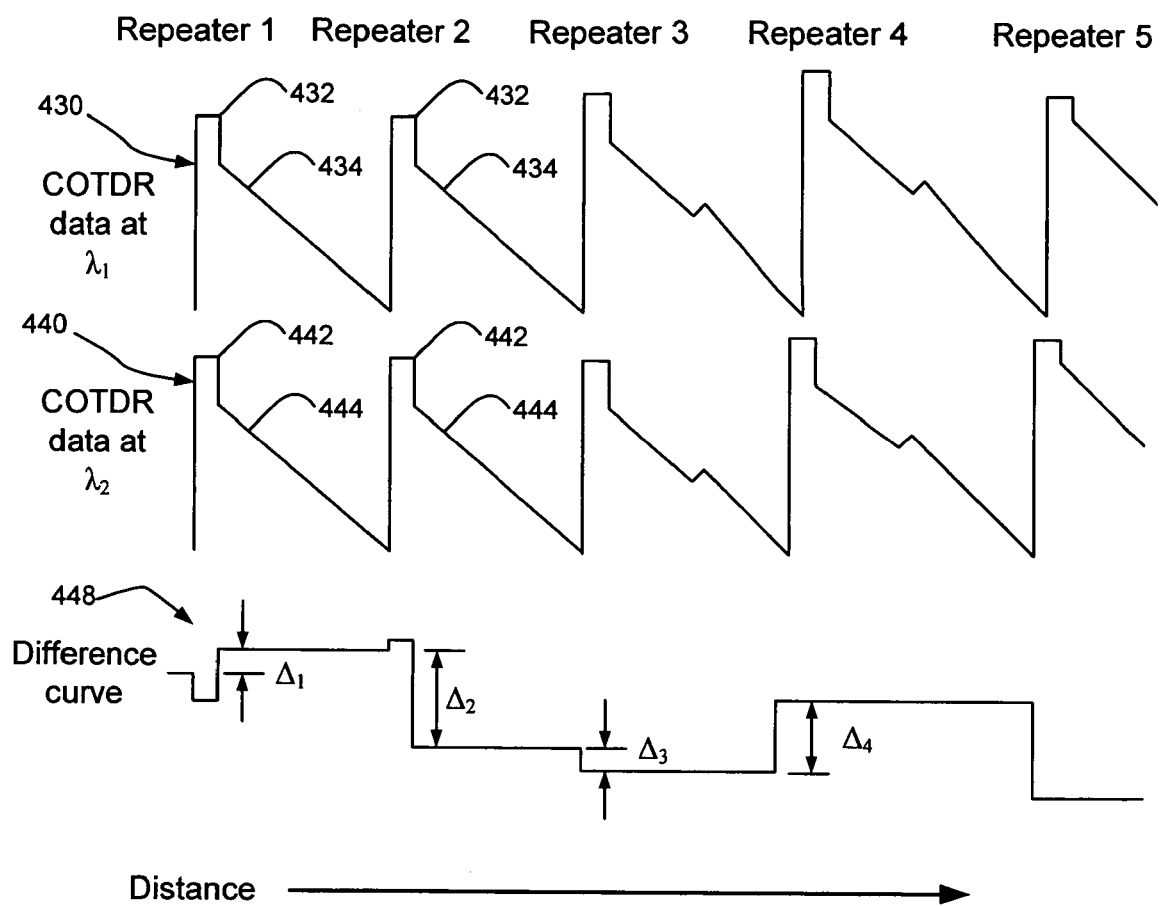
FIG. 10 is a graph illustrating COTDR traces obtained at different test wavelengths and a difference curve.

Referring to FIG. 10, an exemplary method of processing COTDR data to determine difference data representing gain tilt is described in greater detail. The processing of COTDR data to determine difference data may be performed by one or more processors, for example, in the monitoring equipment. The COTDR receiver 404 may detect reflected COTDR test signals to obtain COTDR data (shown as COTDR traces 430, 440) at the upper edge wavelength ($\lambda_{upper\ edge}$) and the lower edge wavelength ($\lambda_{lower\ edge}$). The COTDR traces 430, 440 both correspond to at least one of the optical paths being monitored and provide data corresponding to locations in the optical paths, for example, the amplifier pairs (e.g., repeaters) and transmission spans. For example, the peaks 432, 442 in the COTDR traces 430, 440 correspond to the loop gain between amplifier pairs in each repeater and the slopes 434, 444 correspond to the attenuation in the spans between the repeaters.

The COTDR data at the lower edge wavelength ($\lambda_{lower\ edge}$) may be subtracted from the COTDR data at the upper edge wavelength ($\lambda_{upper\ edge}$) to obtain difference data shown as a difference curve 448 representing a plot of the difference between the two data sets. The difference curve 448 may include a negligible downward slope following each amplifier or repeater (as seen in the OTDR traces 430, 440). The slope is generally associated with Rayleigh scattered light attenuated by the loss of the fiber, which is substantially removed as a result of subtracting the OTDR data sets having similar slope characteristics. There may still be a small finite slope in the difference curve as a result of differences in fiber attenuation, which is expected to be small.

The difference curve 448 represents a measure of gain tilt versus distance, with the steps in the difference curve 448 identifying spans following a span in which the loss is different than the nominal loss. As used herein, "nominal loss" means the normal or expected loss in a particular transmission span design. A step in the difference curve 448, for example, points to the repeater following a span in which the optical loss is far from the nominal gain of the EDFA in the repeater. An EDFA with constant pump power generally operates in compression, i.e., with normal input power, and the EDFA gain may be several decibels lower than the gain of the EDFA with a very small total input power. Thus, if the input power of an EDFA is reduced, the EDFA gain increases indicating optical loss in the span preceding the EDFA. In an optical communication system including spans in which nominal loss yields equal gains at the upper and lower edge wavelengths, for example, a step down in the difference curve 440 indicates that a total span loss is higher than nominal loss and a step up indicates that the total span loss is lower than nominal loss. For example, the step down $\Delta_2$ indicates reduced input power to Repeater 2, which may be caused by a path anomaly in the span before Repeater 2.

One method of extracting an estimated gain tilt from the difference data includes averaging the difference data over a range of distances following each amplifier. The distances may be nearer to the amplifier to avoid problems arising from excessive noise in the OTDR data when its magnitude approaches the sensitivity of the OTDR receiver. In one example, the difference data may be averaged over a range of about 5 to 15 km following each amplifier to estimate the gain tilt at the output of that amplifier. Gain tilt data extracted from the difference data may be used in subsequent processing, such as automatic signature analysis, to characterize and locate faults and to generate fault alarms.

An exemplary method of differential monitoring may also consider power in the COTDR signals when processing COTDR data. A high splice loss at a repeater output may result in low values of COTDR data from the following span of fiber, but it may not induce a significant gain tilt in that span. Because the high loss reduces input power to the next amplifier in the chain, the difference curve will show a step down after the next amplifier. Therefore, by considering the absolute power in the COTDR signals as well as the steps in the difference curve, one can identify spans with excess loss and distinguish between excess loss caused by high splice loss at an amplifier output and high splice loss at an amplifier input. A step down in the difference curve corresponding to one span with lower COTDR data values corresponding to the previous span may indicate splice loss at an amplifier output. A step down in the difference curve corresponding to one span with higher COTDR data corresponding to the previous span may indicate splice loss at an amplifier input. Thus, the differential testing system and method may be used to locate the excess loss.

Figure 11:
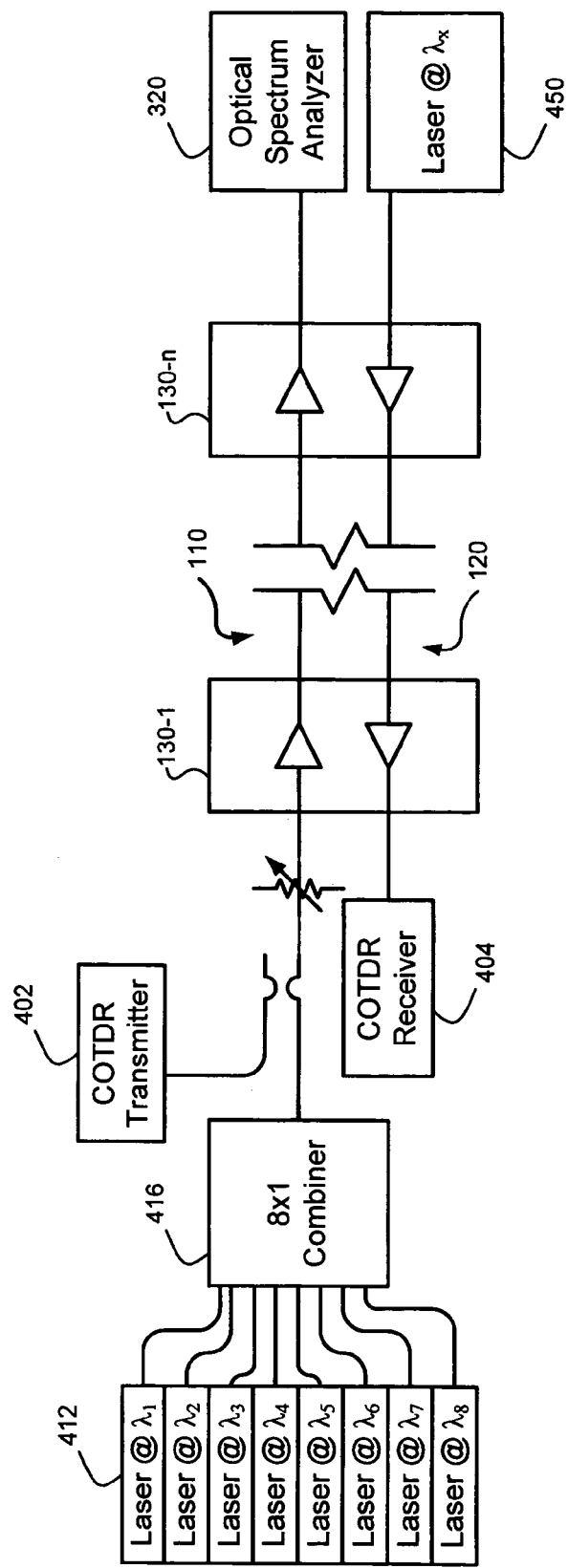
FIG. 11 is a schematic diagram of a further embodiment of a system for monitoring an optical communication system using multi-tone loading and differential COTDR.

Another implementation of a differential monitoring system and method using multi-tone optical loading is shown in FIG. 11. This embodiment is similar to that shown in FIGS. 9A and 9B except a laser 450 may provide optical loading of the inbound or return transmission path 120 at a loading wavelength ($\lambda_x$) that depends upon which COTDR test signal is being measured. The COTDR test signals may be measured sequentially, for example, with the loading wavelength ($\lambda_x$) having different values.

When the COTDR receiver 404 obtains COTDR data at the upper edge wavelength ($\lambda_{upper\ edge}$), for example, the loading wavelength ($\lambda_x$) may be set as close as possible to the upper edge wavelength ($\lambda_{upper\ edge}$) without interfering with the reflected COTDR signal. When the COTDR receiver 404 obtains COTDR data at the lower edge wavelength ($\lambda_{lower\ edge}$), the loading wavelength ($\lambda_x$) may be set as close as possible to the lower edge wavelength ($\lambda_{lower\ edge}$) without interfering with the reflected COTDR signal. The difference curve may then be obtained, as described above, by subtracting the COTDR data at the lower edge wavelength from the COTDR data at the upper edge wavelength.

The differential monitoring system implementations shown in FIGS. 9A and 9B and in FIG. 11 differ in the ability to distinguish between high loss in the outbound optical path 110 and high loss in the inbound optical path 120. By loading the inbound optical path differently, the gain of the reflected COTDR signals may be affected and any loss in the inbound or return optical path 120 may not be indicated by the reflected COTDR signals. Although this differential monitoring system and method by loading the inbound path differently is described in the context of COTDR, this method may also be applied to HLLB monitoring.

Figure 12:
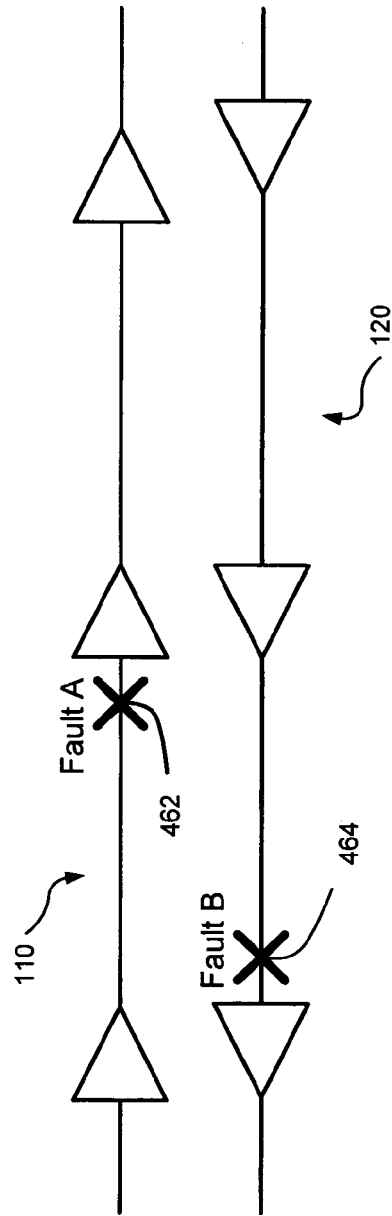
FIG. 12 is a schematic diagram of a pair of optical paths with faults located in each of the optical paths.

Referring to FIG. 12, for example, consider optical paths 110, 120 having fault A 462 and fault B 464, respectively. Using the differential monitoring system and method that provides multi-tone loading on the outbound optical path 110 and on the inbound optical path 120 (FIGS. 9A and 9B), the difference curve does not distinguish between the excess loss at each of the faults 462, 464. For example, the difference curve resulting from a 3 db excess loss at fault A and a 0 dB excess loss at fault B would be the same as the difference curve resulting from 0 dB loss at fault A and 3 dB loss at fault B. All combinations of excess loss at fault A and fault B adding to the same total loss yield the same difference curve when multi-tone loading both optical paths 110, 120.

Using the differential monitoring system and method that provides optical loading on the inbound optical path 120 dependent upon the wavelength of the COTDR signal being measured (FIG. 11), the difference curve may include steps caused almost exclusively by excess loss in the outbound optical path 110. Thus, the signature of a 3 db excess loss at fault A and a 0 dB excess loss at fault B is a step down in the difference curve. If the fault A has 0 dB loss and fault B has 3 dB loss, the difference curve will show almost no step down. When the optical load in the return transmission path 120 is concentrated at a wavelength near the wavelength of the reflected COTDR signal, the gain in the amplifiers on the return path 120 may adjust to accommodate the excess loss in the return path 120 (i.e., the amplifiers come out of compression) and the change in gain does not show up as a tilt at the COTDR signal wavelength. In other words, the loading tone in the return path 120, in conjunction with EDFA compression in the amplifiers in the return path 120, tends to keep the gain in the return path 120 constant at the wavelength of the loading tone. This maintains the gain of the return path 120 nearly constant at the COTDR signal wavelength in spite of instances of excess loss in the return path 120.

Figure 13:
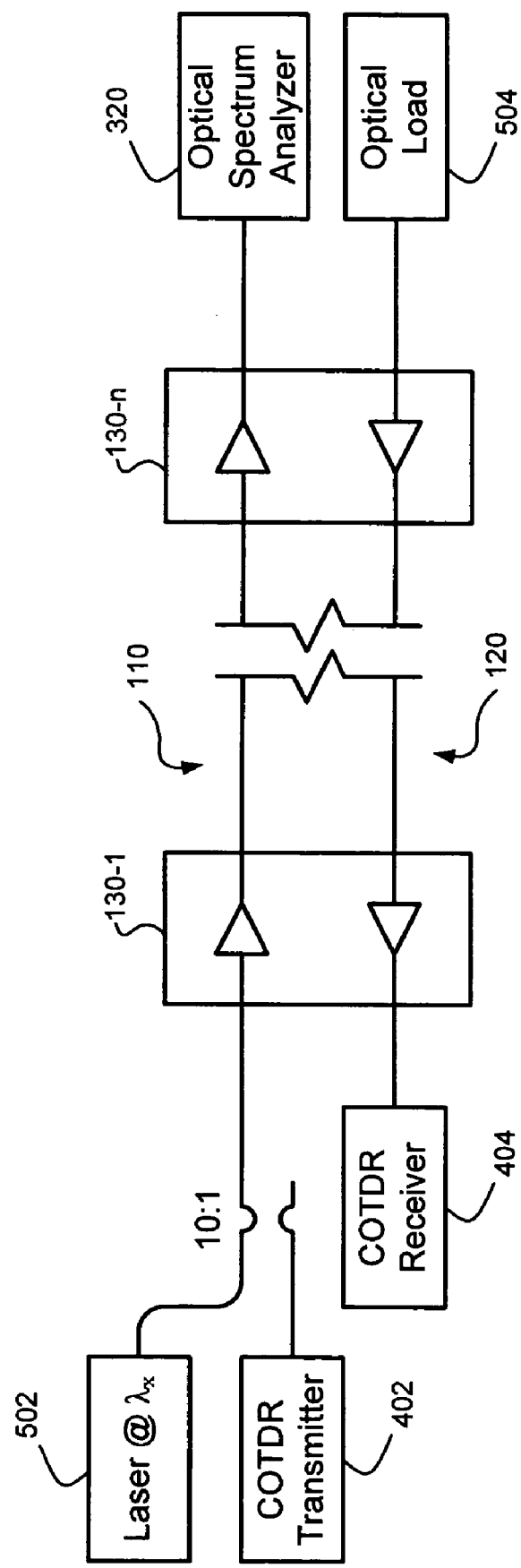
FIG. 13 is a schematic diagram of a further embodiment of a system for monitoring an optical communications system using a single test wavelength and differential COTDR.

Referring to FIG. 13, another differential monitoring system and method obtains differential test signal measurements based on a shifted optical load in the outbound transmission path 110. Although this differential monitoring system and method is described in the context of COTDR, this method may also be applied to HLLB monitoring.

According to this embodiment, the monitoring equipment may include a COTDR transmitter 402 that transmits a COTDR test signal at a single test wavelength that is near the long wavelength edge of the passband of the amplifier chain (e.g., at 1563 nm). A laser 502 provides an optical load at a loading wavelength ($\lambda_x$) that may be set at either the short wavelength edge of the passband or at the long wavelength edge of the passband but not interfering with the COTDR signal. According to this method, the optical power at the loading wavelength ($\lambda_x$) in the outbound path 110 may be large compared to the optical power at the COTDR signal wavelength.

An optical load 504 may also be provided on the return path 120, which is strong enough to fix the amplifier operating points for the return path but not interfering with the reflected COTDR signal (e.g., at 1563 nm). Although the optical load 504 on the return path 120 is not critical, the results may be less ambiguous if the return path 120 is loaded with a single tone at a wavelength close to the COTDR test signal wavelength. This advantageously reduces the influence of excess loss in the return path 120 on the features of the difference curve, as discussed above in connection with FIG. 11.

Figure 14:
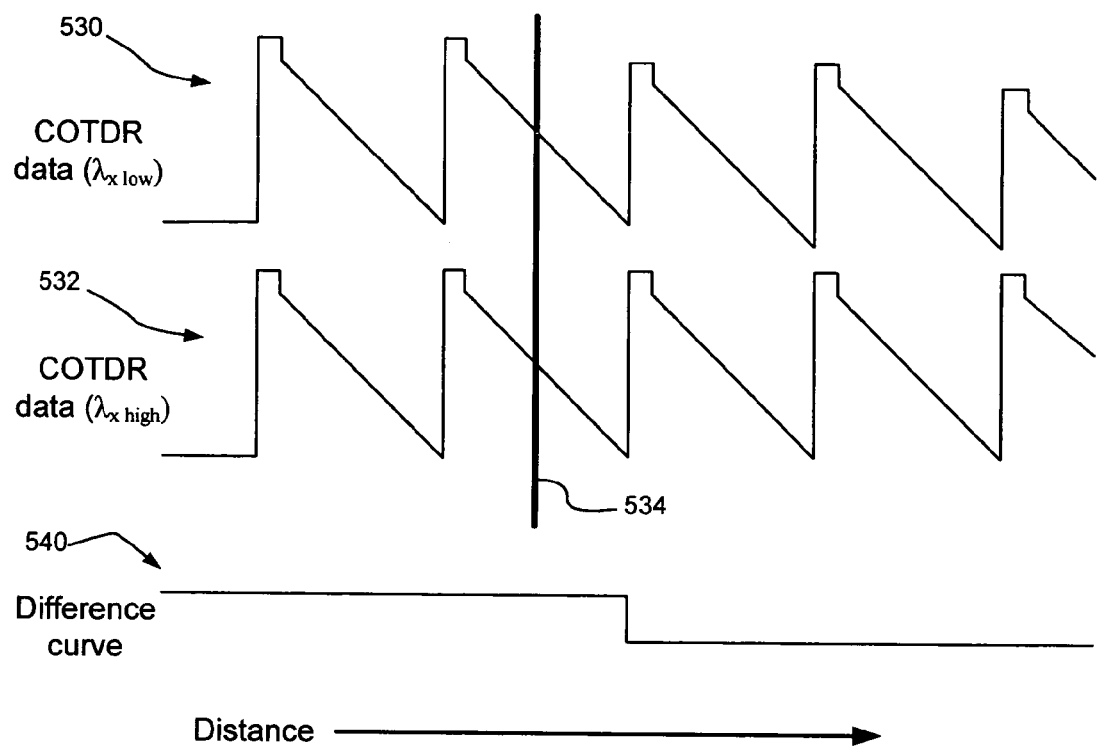
FIG. 14 is a graph illustrating COTDR traces obtained at a single test wavelength with different loading tones and a difference curve.

Referring to FIG. 14, an exemplary method of processing COTDR data obtained using a single test wavelength with different loading wavelengths is described in greater detail. The COTDR receiver 404 may obtain two COTDR traces 530, 532—one with the loading wavelength ($\lambda_{x\ low}$) at the short wavelength edge of the passband and the second with the loading wavelength ($\lambda_{x\ high}$) as close to the COTDR signal test wavelength as possible without interfering with the COTDR signal. In one example, the first COTDR trace 530 is taken at a loading wavelength ($\lambda_{x\ low}$) of 1540 nm and the second COTDR trace 532 is taken at a loading wavelength ($\lambda_{x\ high}$) of 1560 nm. Those skilled in the art will recognize that other wavelengths may be used. The second COTDR data set ($\lambda_{x\ high}$) may be subtracted from the first COTDR data set ($\lambda_{x\ low}$) to produce difference data, shown as a difference curve 540. The difference curve 540 may include a downward step at the repeater following a span in which there is excess loss as indicated by line 534.

Figure 15:
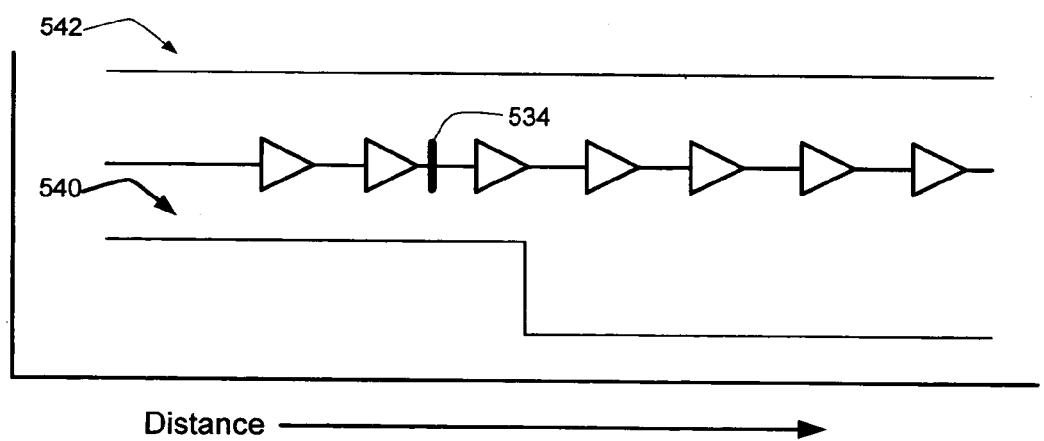
FIG. 15 is a schematic diagram and graph illustrating a difference curve corresponding to an optical path with an excess loss.

This method of differential monitoring using a single COTDR test wavelength produces a signature identifying a span with excess loss because of the amplifier saturation effect (i.e., compression) that enables the effects of outbound loss to be separate from inbound loss. All amplifiers may have nearly the same output power because the saturated amplifiers tend to maintain constant output power even if the input power changes significantly. Most of the output power, however, will be at the wavelength ($\lambda_x$) of the saturating load. The span gain at the COTDR test wavelength may vary depending on the gain versus wavelength characteristics of the amplifier and the separation in wavelength between the loading tone and the COTDR signal. Excess span loss may change the gain versus wavelength curve in the following amplifier. As shown in FIG. 15, for example, excess loss indicated by line 534 may cause the difference curve 540 to deviate from the expected curve 542 when all span losses are nominal.

Figure 16:
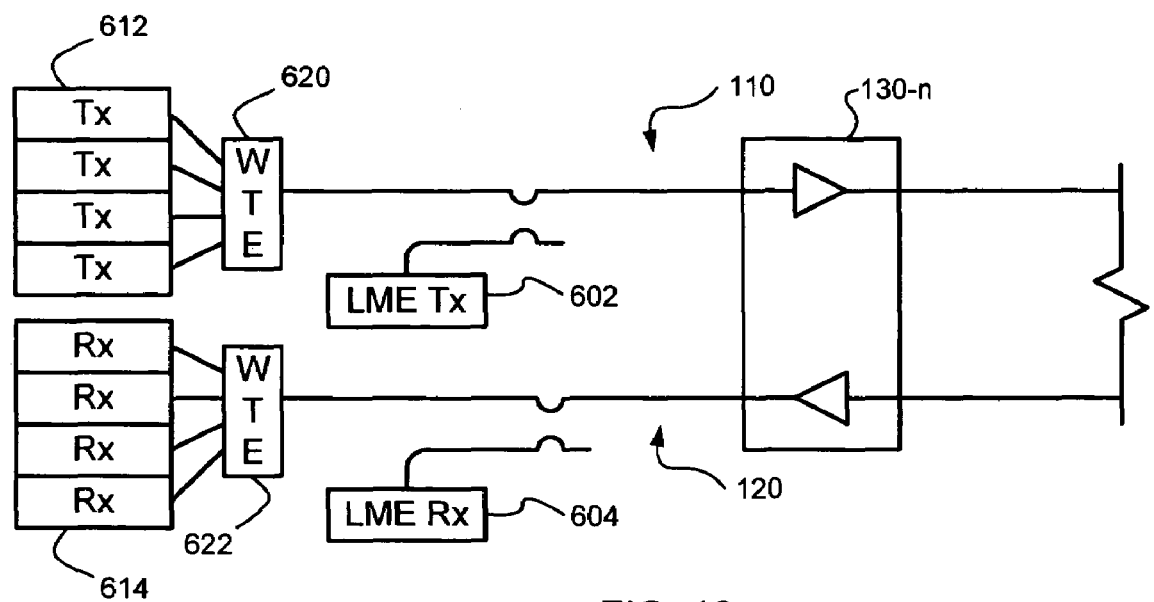
FIG. 16 is a schematic diagram of yet another embodiment of a system for monitoring an optical communication system using a differential line monitoring system.

The embodiments of the differential monitoring system and method described above may also be implemented using a differential line monitoring system, as shown in FIG. 16. According to this implementation, monitoring equipment may include line monitoring equipment (LME) transmitter 602 coupled to the outbound optical path 110 and LME receiver 604 coupled to the inbound optical path 120. In one embodiment, a plurality of optical transmitters 612 and receivers 614 are coupled to the inbound optical path 110 using wavelength termination equipment (WTE) 620, 622. The inbound and outbound optical paths 110, 120 may be connected at the other end to an undersea plant.

The LME transmitter 602 may be used to transmit the test signals on the outbound optical path 110 in a manner similar to the methods described above. The LME receiver 604 receives the test signals and obtains a difference of the detected test signals to produce the difference data similar to the methods described above. According to one embodiment, the optical transmitters 612 may be used to provide the optical loading of the outbound optical path 110 as described above. LME equipment and techniques known to those skilled in the art may be used. Those skilled in the art will recognize that other optical monitoring systems and methods may also be used to provide the differential testing described herein.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method comprising:
    transmitting at least one optical time domain reflectometry (OTDR) test signal on a first optical path, wherein said OTDR test signal is reflected by at least one reflecting element in said first optical path and a reflected OTDR test signal is coupled onto a second optical path;
    detecting said at least one reflected OTDR test signal on said second optical path to obtain OTDR data;
    applying at least one linear fit to said OTDR data, each said linear fit extending to a point corresponding to a known repeater location, said applying said linear fit including determining a slope and vertical offset of lines to be fit to portions of said OTDR data corresponding to spans in said optical path;
    calculating an average slope value of said lines fit to said portions of said OTDR data and re-applying said linear fit using said average slope value;
    deriving loop gain data from said OTDR data by identifying an intersection of each said linear fit and said known repeater location; and
    monitoring a condition of said first optical path using said loop gain data.

2. The method of claim 1 processing said loop gain data derived from said OTDR data using automatic signature analysis.

3. The method of claim 1 wherein said OTDR test signal is a coherent optical time domain reflectometry (COTDR) test signal.

4. A method of monitoring an optical communication system using differential optical time domain reflectometry (OTDR), said optical communication system including first and second optical paths, said first and second optical paths being coupled together, said method comprising:
    optically loading at least said first optical path including multi-tone optically loading at least said first optical path using multiple loading tones at different loading wavelengths;

transmitting a first OTDR test signal on said first optical path at a first test wavelength lower than said loading wavelengths;

transmitting a second OTDR test signal on said first optical path at a second test wavelength higher than said loading wavelengths;

detecting first and second reflected OTDR signals on said second optical path to produce first and second sets of OTDR test data, said first and second reflected OTDR signals corresponding to said first and second OTDR test signals being reflected from at least one reflecting element in said first optical path;

determining a difference between said first and second sets of OTDR test data to produce difference data representing gain tilt in at least one of said optical paths; and monitoring a condition of said at least one of said optical paths using said difference data.

5. The method of claim 4 further comprising deriving loop gain data from said OTDR data, and wherein said loop gain data is used to produce said difference data.

6. The method of claim 4 further comprising multi-tone optically loading said second optical path using multiple loading tones at different loading wavelengths.

7. The method of claim 4 wherein said first test wavelength is at or near a short wavelength edge of an operating wavelength range of said optical communication system, and wherein said second test wavelength is at or near a long wavelength edge of said operating wavelength range of said optical communication system.

8. The method of claim 4 wherein determining said difference between said first and second sets of OTDR test data produces a difference curve, and further comprising locating excess loss in said optical communication system based on steps in said difference curve.

9. The method of claim 4 wherein determining said difference between said first and second sets of OTDR test data produces a difference curve, further comprising locating excess loss in said optical communication system based on steps in said difference curve and an optical power level of said first and second reflected OTDR signals detected in said second optical path.

10. A method of monitoring an optical communication system using differential optical time domain reflectometry (OTDR), said optical communication system including first and second optical paths, said first and second optical paths being coupled together, said method comprising:

optically loading at least said first optical path;

optically loading said second optical path using at least one loading tone;

transmitting a first OTDR test signal on said first optical path;

transmitting a second OTDR test signal on said first optical path;

detecting first and second reflected OTDR signals on said second optical path to produce first and second sets of OTDR test data, said first and second reflected OTDR signals corresponding to said first and second OTDR test signals being reflected from at least one reflecting element in said first optical path;

determining a difference between said first and second sets of OTDR test data to produce difference data representing gain tilt in at least one of said optical paths; and monitoring a condition of said at least one of said optical paths using said difference data, wherein said first OTDR test signal is transmitted at a first test wavelength, wherein said second OTDR test signal is transmitted at a second test wavelength, and wherein said loading tone has a wavelength at or near said first test wavelength when detecting said first reflected OTDR signal, and wherein said loading tone has a wavelength at or near said second test wavelength when detecting said second OTDR signal.

11. The method of claim 10 wherein said first test wavelength is at or near a short wavelength edge of an operating wavelength range of said optical communication system, and wherein said second test wavelength is at or near a long wavelength edge of said operating wavelength range of said optical communication system.

12. The method of claim 11 wherein optically loading at least said first optical path includes multi-tone optically loading at least said first optical path using multiple loading tones at different loading wavelengths.

13. A method of monitoring an optical communication system using differential optical time domain reflectometry (OTDR), said optical communication system including first and second optical paths, said first and second optical paths being coupled together, said method comprising:

optically loading at least said first optical path;

transmitting a first OTDR test signal on said first optical path;

transmitting a second OTDR test signal on said first optical path;

detecting first and second reflected OTDR signals on said second optical path to produce first and second sets of OTDR test data, said first and second reflected OTDR signals corresponding to said first and second OTDR test signals being reflected from at least one reflecting element in said first optical path;

determining a difference between said first and second sets of OTDR test data to produce difference data representing gain tilt in at least one of said optical paths; and monitoring a condition of said at least one of said optical paths using said difference data wherein optically loading at least said first optical path includes optically loading said first optical path using a first loading tone at a first loading wavelength and optically loading said first optical path using a second loading tone at a second loading wavelength, wherein said first and second OTDR test signals are transmitted at the same test wavelength, and wherein said first reflected OTDR signal is detected when said first optical path is optically loaded using said first loading tone at said first loading wavelength, and wherein said second reflected OTDR signal is detected when said first optical path is optically loaded using said second loading tone at said second loading wavelength.

14. The method of claim 13 wherein said first loading wavelength is at or near a short wavelength edge of an operating wavelength range of said optical communication system, and wherein said second loading wavelength is at or near a long wavelength edge of said operating wavelength range of said optical communication system.

15. The method of claim 13 further comprising optically loading said second optical path using at least one loading tone.

16. A method of monitoring an optical communication system using differential coherent optical time domain reflectometry (COTDR), said optical communication system including first and second optical paths being coupled together, said method comprising:

optically loading at least said first optical path using multiple loading tones at different loading wavelengths;

transmitting a first COTDR test signal on said first optical path at a first test wavelength lower than said loading wavelengths;

transmitting a second COTDR test signal on said first optical path at a second test wavelength higher than said loading wavelengths;

detecting first and second reflected COTDR signals on said second optical path to produce first and second sets of COTDR test data, and said first and second reflected COTDR signals corresponding to said first and second COTDR test signals being reflected from at least one reflecting element in said first optical path;

determining a difference between said first and second sets of COTDR test data to produce difference data representing gain tilt in at least one of said optical paths; and monitoring a condition of said at least one of said optical paths using said difference data.

17. The method of claim 16 further comprising optically loading said second optical path using multiple loading tones at different loading wavelengths.

18. A method of monitoring an optical communication system using differential coherent optical time domain reflectometry (COTDR), said optical communication system including first and second optical paths being coupled together, said method comprising:

optically loading at least said first optical path using multiple loading tones at different loading wavelengths;

transmitting a first COTDR test signal on said first optical path at a first test wavelength;

transmitting a second COTDR test signal on said first optical path at a second test wavelength;

detecting first and second reflected COTDR signals on said second optical path to produce first and second sets of COTDR test data, and said first and second reflected COTDR signals corresponding to said first and second COTDR test signals being reflected from at least one reflecting element in said first optical path;

determining a difference between said first and second sets of COTDR test data to produce difference data representing gain tilt in at least one of said optical paths;

monitoring a condition of said at least one of said optical paths using said difference data; and optically loading said second optical path using a loading tone having a wavelength proximate said first test wavelength when detecting said first reflected COTDR test signal and having a wavelength proximate said second test wavelength when detecting said second reflected COTDR test signal.

19. A system comprising:

first and second optical paths configured to transmit optical signals in opposite directions;

at least one coupling path coupling said first optical path to said second optical path;

at least one optical load for optically loading at least said first optical path;

at least one optical load for loading said second optical path using at least one loading tone; and monitoring equipment configured to transmit first and second OTDR test signals on said first optical path, to detect first and second reflected OTDR test signals to obtain first and second OTDR data sets, and to determine a difference between said OTDR data sets to produce difference data representing gain tilt in at least one of said optical paths, wherein said monitoring equipment is configured to transmit said first OTDR test signal at a first test wavelength and said second OTDR test signal at a second test wavelength, and wherein said loading tone has a wavelength at or near said first test wavelength when detecting said first reflected OTDR test signal, and wherein said loading tone has a wavelength at or near said second test wavelength when detecting said second reflected OTDR test signal.

20. The system of claim 19 wherein said monitoring equipment is configured to process OTDR data to derive loop gain OTDR data sets by applying at least one linear fit to said OTDR data and identifying an intersection between each said linear fit and a known repeater location and to determine a difference between said loop gain OTDR data sets to produce said difference data representing gain tilt.

21. The system of claim 19 wherein said optical load loads said first and second optical paths with multiple loading tones.

22. The system of claim 19 wherein said monitoring equipment is configured to transmit said first OTDR test signal at a first test wavelength and said second OTDR test signal at a second test wavelength.

23. The system of claim 22 wherein said first test wavelength is at or near a short wavelength edge of an operating wavelength range of said optical communication system, and wherein said second test wavelength is at or near a long wavelength edge of said operating wavelength range of said optical communication system.

24. The system of claim 19 wherein said first test wavelength is at or near a short wavelength edge of an operating wavelength range of said optical communication system, and wherein said second test wavelength is at or near a long wavelength edge of said operating wavelength range of said optical communication system.

25. A system comprising:

first and second optical paths configured to transmit optical signals in opposite directions;

at least one coupling path coupling said first optical path to said second optical path;

at least one optical load configured to generate a first loading tone at a first loading wavelength and a second loading tone at a second wavelength for optically loading at least said first optical path; and monitoring equipment configured to transmit first and second OTDR test signals on said first optical path, to detect first and second reflected OTDR test signals to obtain first and second OTDR data sets, and to determine a difference between said OTDR data sets to produce difference data representing gain tilt in at least one of said optical paths, wherein said monitoring equipment is configured to transmit said first and second OTDR test signals at the same test wavelength, and wherein said monitoring equipment is configured to detect said first reflected OTDR test signal when said first optical path is optically loaded using said first loading tone at said first loading wavelength, and to detect said second reflected OTDR test signal when said first optical path is optically loaded using said second loading tone at said second loading wavelength.

* * * * *